J. H. PAIGE.
SHAKING MIXER.
APPLICATION FILED JULY 5, 1918.

1,312,569. Patented Aug. 12, 1919.

Inventor
James H. Paige
By G. N. Hawlin
his Attorney

UNITED STATES PATENT OFFICE.

JAMES H. PAIGE, OF MANCHESTER, NEW HAMPSHIRE.

SHAKING MIXER.

1,312,569.   Specification of Letters Patent.   Patented Aug. 12, 1919.

Application filed July 5, 1918. Serial No. 243,362.

*To all whom it may concern:*

Be it known that I, JAMES H. PAIGE, a citizen of the United States, residing at Manchester, in the county of Hillsborough and State of New Hampshire, have invented certain new and useful Improvements in Shaking Mixers, of which the following is a specification.

My object is to provide an improved shaking mixer for mixing or blending gravies, salad dressings, liquid and semi-liquid drinks, beverages, concoctions and the like which will insure very rapid and easy mixing, will be sanitary, easily opened and closed, and readily cleaned.

The invention embodies a receptacle, such as a jar, or the like, a readily removable cover, such as a screw-cap, and a plurality of, preferably two, multi-armed mixers which are interrelated, combined, and suspended from the cover in a novel manner, whereby they are self-contained with the cover, as a unitary structure which can be quickly and easily applied to, or removed from, the receptacle. The interrelation and combination of the multi-armed mixers is such that they mutually coöperate to split up, or break up, the fluid or semi-liquid substance which may be undergoing treatment in the receptacle, into numerous streams, thereby insuring thorough mixing.

The invention is set forth hereinafter and embodied in the appended claims.

Figure 1:
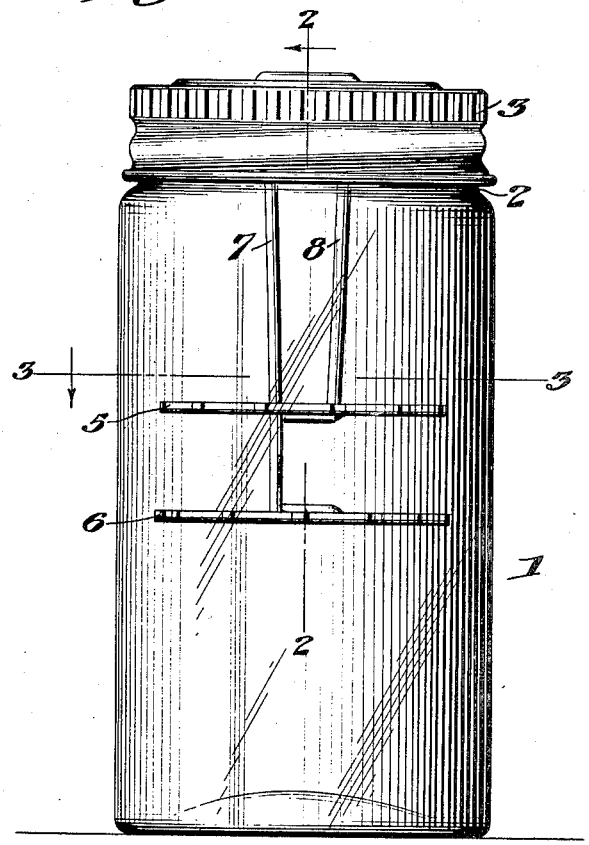
Figure 2:
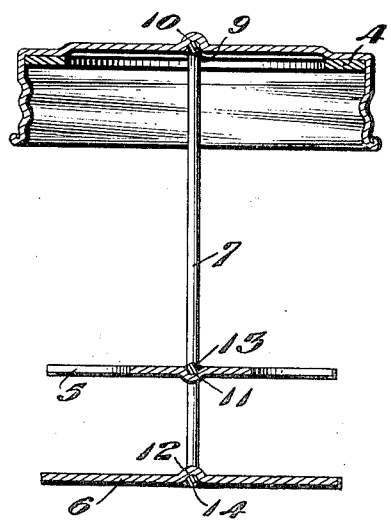
Figure 3:
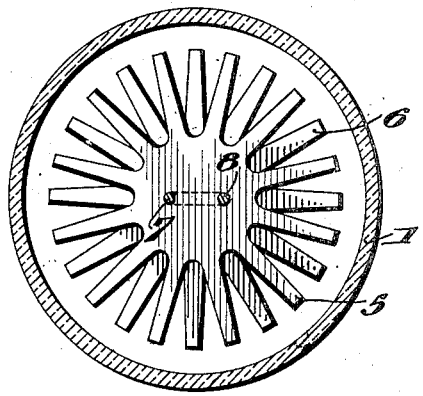

In the accompanying drawings:

Figure 1 is a side elevation of the complete invention;

Fig. 2, a detail view, partly in section, of the cover and mixers detached from the jar;

Fig. 3, a section on line 3—3, Fig. 1; and

Figure 4:
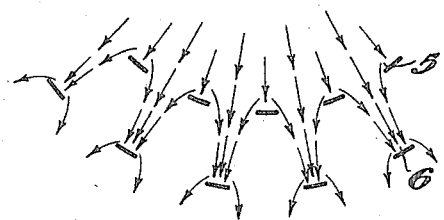

Fig. 4, a diagram of the mixing action.

The receptacle 1 may be of any preferred form and kind, but I prefer to employ a glass jar as it is cleanly, readily cleaned, and permits observation of the contents thereof. The jar has the usual screw-threads 2.

The cover 3 may be of any desired nature which will securely seal the jar against leakage when agitated; preferably, a screw-cap with an internal gasket or washer 4 is used.

Multi-armed mixers 5 and 6 are secured to the parts 7 and 8 of a wire whose upper, bent, intermediate portion 9 is received in a groove 10 in the underside of the cover 3 and held by solder. The mixers have grooves 11 and 12, respectively, in their undersides in which lie the bent ends 13 and 14 of the parts 7 and 8 of the wire, solder securing said bent parts; the parts 7 and 8 pass through holes in the mixers.

The mixers 5 and 6 may be duplicates, each being formed, preferably by stamping, from sheet metal with a central hub and arms radiating therefrom, thus providing a relatively large surface which will be exposed to the fluid or semi-liquid substance being treated and insuring thorough mixing or blending.

The mixers 5 and 6 are relatively set so that the arms of one are opposite the spaces between the arms of the other. Consequently, when the ingredients to be mixed or blended pass from one mixer to the other, that which passes between the open spaces of one mixer, strikes the arms on the second mixer, and splits and passes off on each side diagonally on its journey to the other end of the jar 1. Similarly, that part of the ingredients which strikes the arms of the first mixer, splits and passes off on each side diagonally and strikes the arms of the next mixer. The action is reversed when the contents of the jar 1 return from the opposite end of the jar.

The diagram shown in Fig. 4 illustrates the action of the fluid, or semi-fluid, ingredients in passing from one mixer to the other.

The provision of the grooves 10, 11, 12, enables the least amount of solder to securely hold the wire to the cover and the mixers to the wire. Preferably, the groove 11 will be in line with the spaces between the arms of its mixer and the groove 12 in line with the arms of its own mixer; consequently, correct assembly of the mixers, with the arms of one, opposite the spaces between the arms of the other, will result. The mixers are preferably two in number but a greater number may be employed. They are spaced a sufficient distance apart to enable the ingredients to act in the manner before described and are preferably grouped so that they will be located at about the general intermediate region between the ends of the jar 1.

The device is operated by shaking it manually, or mechanically, in the direction of the length of the jar 1, in reciprocatory fashion.

My invention is susceptible of modification without departing from its essential principle; the disclosure given is, therefore, to be considered as illustrative, rather than restrictive, of the scope of the invention.

What I claim is:

1. A shaking mixer comprising a receptacle, and a unitary structure embodying a receptacle-cover, a suspending device depending from said cover, and a plurality of laterally-arranged multi-armed mixers carried by said suspending device and arranged in groups at different heights one above the other within the receptacle, the arms of both mixers projecting freely from the suspending device and those of one mixer being disposed vertically above the spaces between another mixer.

2. A shaking mixer comprising a receptacle, and a unitary structure embodying a receptacle-cover provided with a groove on its under side, a multi-armed mixer disposed laterally within the receptacle, said arms projecting freely, the mixers being provided with a groove, said mixer and cover being connected by a wire having bent ends respectively received within the grooves aforesaid and secured to the cover and mixer.

3. A shaking mixer comprising a receptacle, and a unitary structure embodying a cup-like screw cover removably attached to the receptacle, a plurality of multi-armed sheet metal mixers disposed laterally within the receptacle, one above the other, in spaced relation, the arms of each mixer projecting freely and those of one mixer being arranged opposite the spaces between the arms of another mixer, said cover and mixers having grooves, and a pair of wires located side by side having bent parts received in said grooves and secured to the cover and mixers, said cover being adapted to serve as a drip catcher when the unitary structure is removed from the receptacle and inverted.

In testimony whereof I affix my signature.

JAMES H. PAIGE